Oct. 26, 1926.
R. A. HALLORAN ET AL
1,604,641
TREATMENT OF ACID SLUDGE
Filed August 7, 1922
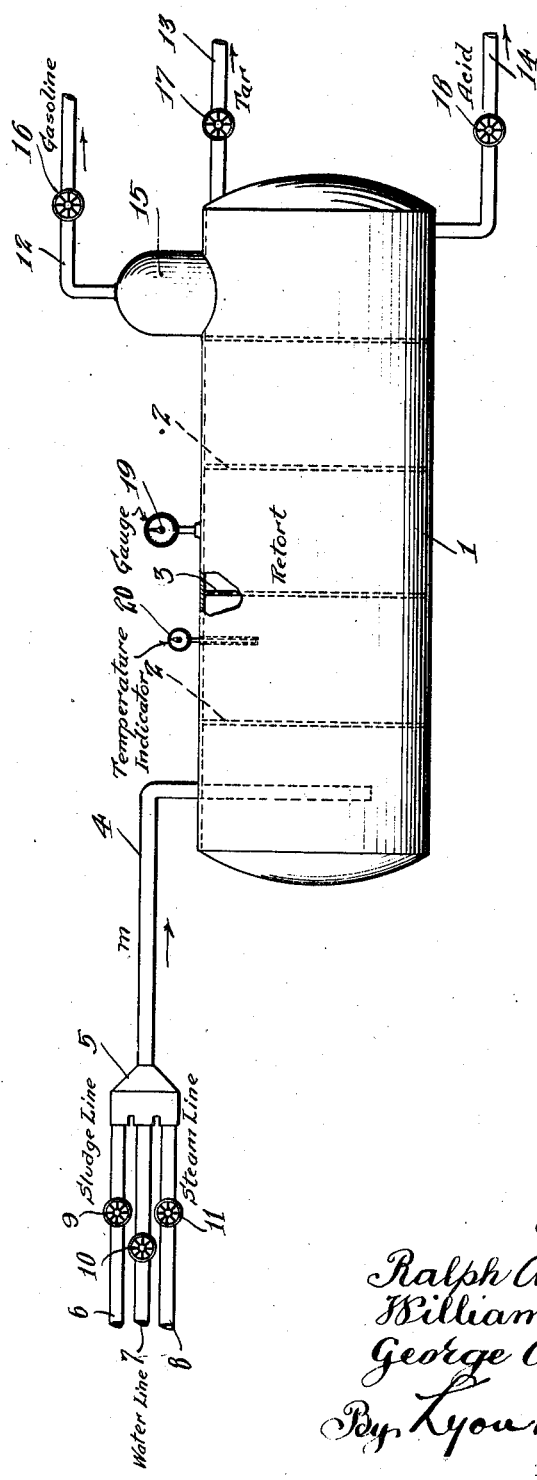
Inventors
Ralph A. Halloran
William N. Davis
George A. Davidson
By Lyon & Lyon Attys.

Patented Oct. 26, 1926.

1,604,641

UNITED STATES PATENT OFFICE.

RALPH A. HALLORAN, OF BERKELEY, WILLIAM N. DAVIS, OF OAKLAND, AND GEORGE A. DAVIDSON, OF BERKELEY, CALIFORNIA, ASSIGNORS TO STANDARD OIL COMPANY, OF SAN FRANCISCO, CALIFORNIA, A CORPORATION OF CALIFORNIA.

TREATMENT OF ACID SLUDGE.

Application filed August 7, 1922. Serial No. 580,311.

Our invention relates to the process of treating acid sludge, obtained by the action of sulphuric acid on petroleum oils or distillates, for recovering from said acid sludge the sulphuric acid and a combustible tar.

Petroleum oils or distillates all contain more or less of those constituents known as unsaturated and aromatic compounds. These materials are commonly removed, either partly or entirely, in the refining of petroleum oils for different purposes. In such refining processes, petroleum oils are treated with sulphuric acid, the unsaturated and aromatic material combines with the sulphuric acid producing compounds which are precipitated from the treated oil in the form of a tarry sludge. The sludge contains not only the products of reaction but includes a certain amount of uncombined acid.

The nature of the acid sludge obtained by such treatment of petroleum oils varies very greatly. The factors which govern the nature of such sludge are the gravity of the petroleum oil or distillate treated, the nature of the unsaturated and aromatic material present, the strength of the acid used in treatment and the physical conditions under which the treatment is conducted, such as temperature, means of agitation, proportions of oil and acid, etc. It naturally follows that the difficulties encountered in the treatment of these acid sludges and the products obtained thereby, depend largely on the nature of the sludge which is treated.

Two classes of compounds contained in petroleum or petroleum distillates are attacked by sulphuric acid, one the unsaturated hydrocarbons and the other the aromatic hydrocarbons. The action of sulphuric acid on these different series produce acid sludges which are quite different, having different properties and requiring different methods of treatment. What material will be removed from the petroleum oil or distillate depends greatly on the strength of the acid used in the treatment.

We are aware there have been proposed a number of recovery processes for treatment of acid sludge but such processes are limited in their application to only the more easily treated sludges. These processes are unsuited either to the treatment of sludge obtained from the heavier oils or to the treatment of sludges obtained by the action of very concentrated or fuming acids on certain petroleum oils or distillates, or they require such quantities of heat and special apparatus, etc., as to make them totally unsuitable for commercial application.

It is not sufficient in the treatment of acid sludge that most of the tarry matter should be separated from the acid. It is necessary to produce an acid practically free from tarry matter or dissolved sulphonic acids. Otherwise, such produced acid cannot be properly concentrated for use due to the excessive foaming, carbonization and separation of tar in the concentrating process. The acid sludges obtained at a refinery not only represent a large loss of valuable constituents such as sulphuric acid and tar, but these acid sludges are a great nuisance around the refinery and difficult to dispose of.

In the copending application, Serial No. 569,551, filed June 19, 1922, issued October 14, 1924, Number 1,511,721, there is described a commercial process for treating these acid sludges and especially for treating such acid sludges as have been obtained from the action of concentrated or fuming acids on lamp oil stocks. This invention is an improvement over the process described in said pending application.

A specific object of this invention is to provide a process whereby it is possible to carry on continuously the hydrolysis of these acid sludges.

Our invention will be more readily understood by reference to the accompanying drawing which illustrates diagrammatically an apparatus in which a preferred embodiment of our invention can be economically performed.

There is provided an insulated retort 1 which preferably contains baffle plates 2 which separate the retort into compartments. The baffle plates 2 contain openings 3 of suitable design for permitting the tar, sludge and acid from one compartment to pass to the next. While the baffle plates are not necessary for the operation of our process they facilitate the separation of the tar and sulphuric acid obtained by hydrolysis of the acid sludge.

The retort 1 is provided with a feed line 4 which preferably enters an end compartment of the retort. The feed line 4 is provided with a triple connection 5 to which lines 6, 7 and 8 are connected which conduct respectively acid sludge, water and steam. (The sources of acid sludge, water and steam are not shown in the drawing.) While we have shown the triple connection 5 outside the retort 1 it is obvious that a similar means for commingling the supplies might be provided inside the retort 1. The lines 6, 7 and 8 are provided with valves 9, 10 and 11, respectively, for regulating the supply of the feed.

The retort 1 is provided with a gas discharge line 12, a tar discharge line 13 and an acid discharge line 14. The discharge lines are preferably connected to the compartment in the retort on the end opposite the feed line 4. The gas discharge line 12 is preferably connected to a gas dome 15 provided in the last compartment of the retort. The discharge lines 12, 13 and 14 are provided with suitable valves 16, 17 and 18, respectively, for regulating the amount of the respective discharges. The retort 1 is provided with a pressure gauge 19 for indicating the pressure in the retort, and temperature indicator 20.

In the preferred adaptation of our invention acid sludge, water and steam are continually commingled in the feed line 4 and introduced into the retort 1. The proportions of water, steam and sludge are regulated by operation of the valves 9, 10 and 11 so that the sulphuric acid which is produced will be diluted to a specific gravity of not greater than 1.526 (50° Baumé), and so that the heat supplied by the steam together with the heat of reaction of the acid in the sludge is sufficient to raise the commingled mass to the hydrolyzing temperature, commonly between 330° F., and 375° F.

It will be further understood that heat may be supplied by other means than with steam, such for instance as by preheating the acid sludge or water or both, or by heating the mixture after commingling by any practical means.

In operation the unit is held under pressure sufficient to maintain the aforesaid required temperature; the pressure is commonly over 50# gauge.

It has been found that by the aforesaid means of commingling the feed the hydrolysis of the acid sludge is practically complete when it enters the retort 1. The acid sludge hydrolyzes into tar and sulphuric acid which separate in layers in the retort while passing through the compartments. The tar appears as an upper layer in the retort from which it is continually withdrawn by the line 13. The acid forms the lower layer and is continually withdrawn through the line 14. Gases from the reaction are continually withdrawn through the line 12. The rate of supply of the feeds and withdrawal of the products are necessarily maintained equal and this rate must not exceed the rate of complete separation of the various constituents. The time of separation of the various constituents has been found to be not in excess of four hours.

An important feature of our process is that the hydrolysis of the acid sludge can be maintained continuously.

A feature of our invention is the efficient method of commingling the feed supplies whereby the hydrolyzing action is accomplished in a very short length of time.

It is understood that our invention is not limited to the specific apparatus and process embodied in the foregoing description but is of the scope set forth in the following claims.

We claim:

1. A process of hydrolyzing acid sludge obtained from the acid treatment of petroleum oil which consists in passing a mixture of said acid sludge, steam and water into a chamber under sufficient pressure to maintain a hydrolyzing temperature in the chamber and during the time of passing the mixture into the chamber discharging acid and tar from the chamber in regulated volumes corresponding to the rate of separation of the acid and tar.

2. A continuous process of hydrolyzing acid sludge obtained from the acid treatment of petroleum which consists in passing a mixture of said acid sludge, steam and water into a chamber under sufficient pressure to maintain a hydrolyzing temperature in the chamber and discharging acid and tar from the chamber in regulated volumes corresponding to the rate of separation of the acid and tar.

3. A process of hydrolyzing acid sludge obtained from the acid treatment of petroleum which consists in continuously passing a mixture of said acid sludge, steam and water into a chamber under sufficient pressure to maintain a hydrolyzing temperature in the chamber, maintaining said mixture in said chamber at the hydrolyzing temperature for the necessary time to permit the separation into layers of tar and acid, and continuously discharging acid and tar from the chamber in regulated volumes corresponding to the rate of separation of the acid and tar.

4. A process of hydrolyzing acid sludge obtained from the acid treatment of petroleum which consists in mixing said acid sludge and water with sufficient steam to raise the mixture to a hydrolyzing temperature, passing the heated mixture into a chamber maintained under a pressure sufficient to maintain the hydrolyzing temperature solely through the resultant heat of reaction, maintaining the mixture in such chamber under such pressure for the necessary time to permit the separation into layers of acid and tar, and during the time of passing such mixture into the chamber discharging acid and tar from the chamber in regulated volumes corresponding to the rate of separation of the acid and tar.

5. A continuous process of hydrolyzing acid sludge obtained from the acid treatment of petroleum oil which consists in passing a heated mixture of acid sludge and water into a chamber under sufficient pressure to maintain a hydrolyzing temperature in the chamber, and discharging acid and tar from the chamber in regulated volumes corresponding to the rate of separation of the acid and tar.

Signed at Richmond, Calif., this 10th day of July, 1922.

RALPH A. HALLORAN.
WILLIAM N. DAVIS.
GEORGE A. DAVIDSON.